US008414391B2

(12) United States Patent
Williams

(10) Patent No.: US 8,414,391 B2
(45) Date of Patent: Apr. 9, 2013

(54) COMMUNICATION METHODS FOR NETWORKED GAMING SYSTEMS

(75) Inventor: David C. Williams, Carson City, NV (US)

(73) Assignee: IGT, Reno, NV (US)

( * ) Notice: Subject to any disclaimer, the term of this patent is extended or adjusted under 35 U.S.C. 154(b) by 316 days.

(21) Appl. No.: 12/728,916

(22) Filed: Mar. 22, 2010
(Under 37 CFR 1.47)

(65) Prior Publication Data

US 2011/0230268 A1 Sep. 22, 2011

(51) Int. Cl.
*A63F 13/00* (2006.01)

(52) U.S. Cl. ............................... 463/29; 463/24; 463/42

(58) Field of Classification Search .................... 463/24, 463/29, 42
See application file for complete search history.

(56) References Cited

U.S. PATENT DOCUMENTS

2002/0002076 A1* 1/2002 Schneier et al. ................ 463/29
2003/0104865 A1* 6/2003 Itkis et al. ........................ 463/39
2005/0141704 A1* 6/2005 Van Der Veen ................. 380/28
2006/0236400 A1* 10/2006 Gudmundsson ................ 726/25
2008/0076525 A1* 3/2008 Kim ................................ 463/22
2009/0227367 A1* 9/2009 Schneier et al. ................ 463/29
2010/0203960 A1* 8/2010 Wilson et al. ................... 463/29
2011/0118016 A1* 5/2011 Lawrence et al. ............... 463/31

* cited by examiner

*Primary Examiner* — James S McClellan
(74) *Attorney, Agent, or Firm* — Foley & Lardner LLP

(57) ABSTRACT

Methods and devices are provided for secure identification and authentication of computing hardware connected to wired or wireless networks, including but not limited to thin clients in server-based systems, mobile gaming devices, etc. Some implementations involve a frequent exchange of information between networked devices. In some implementations the exchange may be so frequent as to be effectively a constant exchange of information, though there may be small time intervals during which no such information is exchanged. Some preferred methods are effective against both external attacks and those benefiting from assistance or information provided by those with administrative access.

32 Claims, 10 Drawing Sheets

FIG. 3A

300a

| Operation (305) | Last Number Received (310) | Penultimate Number Received (315) | Response (320) |
|---|---|---|---|
| A | 0001110010010000 | 0110101010101101 | 0111011000111101 |

FIG. 3B

300b

| Operation (305) | Last Number Received (310) | Penultimate Number Received (315) | Response (320) |
|---|---|---|---|
| A | 0011101010011011 | 0110101010101101 | 0101000000110110 |

500

| Client Code (505) | Client Type (510) | Interrogation Frequency (Milliseconds) (515) | Status (520) | Operation (525) | Last Numbers Sent (530) | Expected Response (535) |
|---|---|---|---|---|---|---|
| A38U4 | Stationary Thin Client | 500 | Active | A | 0110101010101101/ 0001110010010000 | 0111011000111101 |
| 22X91 | Mobile Device | 250 | Active | A | 1011001110100101/ 0011010010010111 | 100011100110010 |
| H5W2Y | Mobile Device | 250 | Inactive | A | N/A | N/A |
| 4BRR7 | EGM/Thick Client | 3000 | Inactive | C | N/A | N/A |
| 00E2M | Stationary Thin Client | 500 | Active | A | 1100011010100101/ 0101001111010101 | 1001010101110000 |

*FIG. 5*

COMMUNICATION METHODS FOR NETWORKED GAMING SYSTEMS

FIELD OF THE INVENTION

The present invention relates generally to methods and devices for providing games, such as wagering games.

BACKGROUND OF THE INVENTION

The advent of networked gaming systems has created both new challenges and opportunities. Small, wireless hardware devices used in mobile gaming are more vulnerable to compromise resulting from theft or tampering than their much larger and heavier counterparts. Even fixed-place "thin" clients introduce a measure of insecurity to the system by providing a network connection which may be usurped by intruders seeking access to the gaming system. (As used herein, the term "thin client" or the like may refer broadly to a "thin client" as the term is generally known in the art as well as to a more versatile device and/or related software, such as a diskless node or a hybrid client. As such, thin clients may be client computers and/or client software that depend, at least to some extent, on one or more central devices for processing activities but which may potentially have a range of processing capabilities. A thin client may or may not be a mobile device and vice versa.) However, the presence of the same network connection which introduces the potential for intrusion also affords new opportunities, such as the real-time monitoring of network assets.

There are many tools and techniques which are quite effective in dealing with unauthorized machines on a network. However, such techniques rely on the ability to distinguish between the authorized and unauthorized machines. When employing such techniques, if one cannot distinguish the "good" machines from the "bad," one cannot grant access only to the former and deny the latter.

Most non-trivial network security systems rely on the hardware MAC (Media Access Control) address to identify devices requesting access. With a unique 48-bit address assigned by the manufacturer to the networking hardware of every device, moderate security can be maintained in many cases by identifying a machine solely based on its MAC address. However, MAC addresses can be changed or cloned with relative ease, thereby allowing an unauthorized machine to impersonate an authorized machine by identifying itself with the latter's MAC address. The hardware providing network services to the client (or its impersonator) rarely takes additional steps to identify the machine. Once granted network access, an unauthorized machine with a cloned MAC address may be able to disrupt the network, capture sensitive data, compromise other machines on the network, and cause harm in any number of other ways.

More advanced security measures may require that a security device with unique verification information be installed in the machine (e.g., in a thin client or a mobile device). When interrogated, the central processing unit CPU may access and read the security device (often an EPROM or other form of read-only memory) and relay the identifying information it contains to the requesting function. Provided that the machine is not tampered with, such methods may allow secure identification of that particular machine.

However, such methods do little to prevent impersonation by a rogue machine that does not have the same identification hardware installed. Given a sample of such hardware extracted from one machine, producing a duplicate (possibly containing data for another valid device obtained from an inside source) would not be difficult. It is even easier to emulate the process in software running on an intruding machine so as to fool a network-based server into thinking that the data were retrieved from the secure hardware inside an authorized machine.

In short, hardware used to identify a machine uniquely may successfully be cloned (duplicated) or emulated in software once it has been analyzed by a sophisticated intruder. For mobile gaming devices, acquiring such hardware security devices may be as simple as sticking a mobile gaming terminal in a pocket and leaving the casino. Subsequent analysis of the device could disclose the nature of any hardware security measures protecting the entire system and permit an attacker (especially one with access to sensitive administrative information, such as the security information of machines other than the one that was purloined) to construct a machine which successfully masquerades as a legitimate client but is designed to infiltrate the network for nefarious purposes.

Even fixed-place gaming devices on wired networks are vulnerable if an intruder is able to gain access to any unprotected section of Ethernet cable. Tapping into the cable may allow an intruder to monitor network traffic and subsequently supplant the legitimate machine with an unauthorized client dedicated to evil purposes. It would be desirable to provide more versatile methods and devices.

SUMMARY OF THE INVENTION

Methods and devices are provided for secure identification and authentication of computing hardware connected to wired or wireless networks, including but not limited to thin clients in server-based systems, mobile gaming devices, etc. Some implementations involve a frequent exchange of information between networked devices. The information may involve a result of a predetermined mathematical operation on previously-provided data. In some implementations the exchange of information may be so frequent as to be effectively a constant exchange of information, though there may be small time intervals between such exchanges of information. As such, although such implementations may sometimes be referred to herein as involving a "constant" exchange of information (or the like), the information exchange may not literally be constant. Some such implementations may be referred to herein as "constant heartbeat interrogation response protocol" or "CHIRP" methods and/or devices.

The protocol used to implement CHIRP may be lightweight and low-overhead. Some preferred implementations of the CHIRP protocol can use a simple predetermined mathematical operation, particularly if the data are (as in preferred implementations) exchanged over a secure communication path.

Some embodiments described herein provide an apparatus, comprising an interface system and a logic system. The interface system includes at least one network interface. The logic system includes at least one logic device, such as a processor, a programmable logic device, etc. The logic system may be configured to do the following: generate a first random number; provide the first random number to a device via the interface system; generate a second random number; provide the second random number to a device via the interface system; receive a response from the device via the interface system; ascertain whether the response comprises a result of a predetermined mathematical operation involving the first random number and the second random number; and determine whether to provide wager gaming services to the device depending, at least in part, on whether the response comprises the result of the predetermined mathematical operation.

The logic system may be further configured to send, via the interface system, a command to disable the device if the response does not comprise the result of the predetermined mathematical operation. The predetermined mathematical operation may, for example, comprise an exclusive "OR" operation, modulo addition, multiplication or convolution.

The logic system may be further configured to determine a time for generating the second random number. The time may, for example, be based upon a predetermined time interval or based upon a randomly determined time interval.

The logic system may be further configured to provide the wager gaming services to the device if the response comprises the result of the predetermined mathematical operation. The logic system may be further configured to provide the wager gaming services to the device prior to at least one of the determining, ascertaining or receiving steps. The logic system may be further configured to stop providing the wager gaming services to the device if the response does not comprise the result of the predetermined mathematical operation.

Alternative implementations described herein provide a method that may include the following steps: generating a first random number; providing the first random number to a device; generating a second random number; providing the second random number to a device; receiving a response from the device; ascertaining whether the response comprises a result of a predetermined mathematical operation involving the first random number and the second random number; and determining whether to provide wager gaming services to the device depending, at least in part, on whether the response comprises the result of the predetermined mathematical operation.

The method may involve determining a time for generating the second random number. The time may, for example, be based upon a predetermined time interval or based upon a randomly determined time interval.

The predetermined mathematical operation may comprise an exclusive "OR" operation. The predetermined mathematical operation may comprise modulo addition, multiplication and/or convolution.

The method may involve sending a command to disable the device if the response does not comprise the result of the predetermined mathematical operation. However, the method may involve providing the wager gaming services to the device if the response comprises the result of the predetermined mathematical operation. In some instances, the method may involve providing the wager gaming services to the device prior to at least one of the determining, ascertaining or receiving steps.

Alternative implementations provide a system that includes the following components: apparatus for generating a first random number and a second random number; apparatus for providing the first random number and the second random number to a device; apparatus for receiving a response from the device; and apparatus for ascertaining whether the response comprises a result of a predetermined mathematical operation involving the first random number and the second random number, and for determining whether to provide wager gaming services to the device depending, at least in part, on whether the response comprises the result of the predetermined mathematical operation. The system may also include apparatus for providing wager gaming services to the device.

Alternative embodiments provide an apparatus that includes a network interface, a display device and a logic system. The logic system may include at least one logic device (such as a processor, a programmable logic device, etc.) and an associated memory. The logic system may be configured to do the following: receive, via the network interface, a first number; store the first number in the memory; receive, via the network interface, a second number; perform a predetermined mathematical operation involving the first number and the second number to produce a first result; transmit the first result to a device via the network interface; and control the display device to display wager gaming images according to instructions received via the network interface. The predetermined mathematical operation may, in some instances, comprise an exclusive "OR" operation.

The logic system may be further configured to receive, via the network interface, a command and to cease the display of wager gaming images in response to the command.

The logic system may be further configured to do the following: receive, via the network interface, a third number; perform the predetermined mathematical operation involving the second number and the third number to produce a second result; and transmit the second result to the device via the network interface. The logic system may be further configured to delete at least one of the second number or the second result.

The logic system may be further configured to delete at least one of the first number or the first result. The logic system may be further configured to store the second number in the memory.

The apparatus may also include a user interface. The logic system may be further configured to receive user input data from the user interface and to transmit the user input data to a game server via the network interface. The network interface may comprise a wired or a wireless interface.

The apparatus may also comprise a speaker. The logic system may be further configured to control the speaker to reproduce wager gaming sounds according to instructions received via the network interface.

Alternative methods are described herein. Some such methods include the following operations: receiving, at a first device, a first number at a first time; storing the first number; receiving, at the first device, a second number at a second time; performing a predetermined mathematical operation involving the first number and the second number to produce a first result; transmitting the first result to a second device; and controlling the first device to make a presentation of wager games, at least in part according to instructions received from the second device.

The method may involve storing the second number. The method may also involve receiving a command at the first device and ceasing the presentation of wager games in response to the command.

The method may also include these operations: receiving, at the first device, a third number; performing the predetermined mathematical operation involving the second number and the third number to produce a second result; transmitting the second result to the second device; and deleting at least one of the first number or the first result.

The first device may comprise a user interface. The method may also include: receiving user input data from the user interface; and transmitting the user input data to a game server.

The first device may comprise a speaker. The method may further comprise controlling the speaker to reproduce wager gaming sounds according to instructions received by the first device.

Alternative devices described herein may include the following: apparatus for receiving a first number and a second number; apparatus for performing a predetermined mathematical operation involving the first number and the second number to produce a first result; apparatus for transmitting the first result to a device; and apparatus for controlling a presentation of wager games, at least in part according to instructions received from the device. The controlling apparatus may be configured to cease the presentation of wager games in response to a command received from the device.

These and other methods of the invention may be implemented by various types of hardware, software, firmware, etc. For example, some features of the invention may be implemented, at least in part, by a personal digital assistant, by a portable gaming device and/or other type of mobile device, by one or more host devices, servers, etc. Some embodiments of the invention are provided as computer programs embodied in machine-readable media. The computer programs may include instructions for controlling one or more devices to perform the methods described herein.

BRIEF DESCRIPTION OF THE DRAWINGS

FIGS. 3A and 3B provide further examples of data structures that may be used by a client device in connection with some implementations.

FIG. 5 illustrates one example of a simplified data structure that may be used by a device of a central system in connection with some implementations.

DETAILED DESCRIPTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. For example, the steps of methods shown and described herein are not necessarily performed in the order indicated. It should also be understood that the methods of the invention may include more or fewer steps than are indicated.

Some systems of the invention include a plurality of networked devices (e.g., servers, host devices, "thin clients," mobile devices and/or other devices) that can provide functions relating to the present invention. Logic systems comprising one or more logic devices (such as processors, programmable logic devices, etc.) may be configured to perform various functions relating to the invention. For example, a logic system may be configured to implement, at least in part, a CHIRP system as described herein.

Device functionality may be apportioned by grouping or dividing tasks in any convenient fashion. Therefore, when steps are described herein as being performed by a single device (e.g., a single server), the steps may alternatively be performed by multiple devices and vice versa.

Some implementations involve CHIRP methods and devices that solve the problem of machine identification through the use of a low-overhead network service that maintains frequent communication between the server and clients. Preferably initialized at startup by authorized personnel, a frequent exchange of information between networked devices (e.g., between servers and clients) ensures that authorized devices are operational, remain connected to the network, and are not replaced by unauthorized impersonators. Further, efforts to defeat this method of security by stealing and analyzing an authorized client would likely be ineffective, as the security is inherent in the information exchange method and does not need to reside in any secret hardware device or software module.

Figure 1:
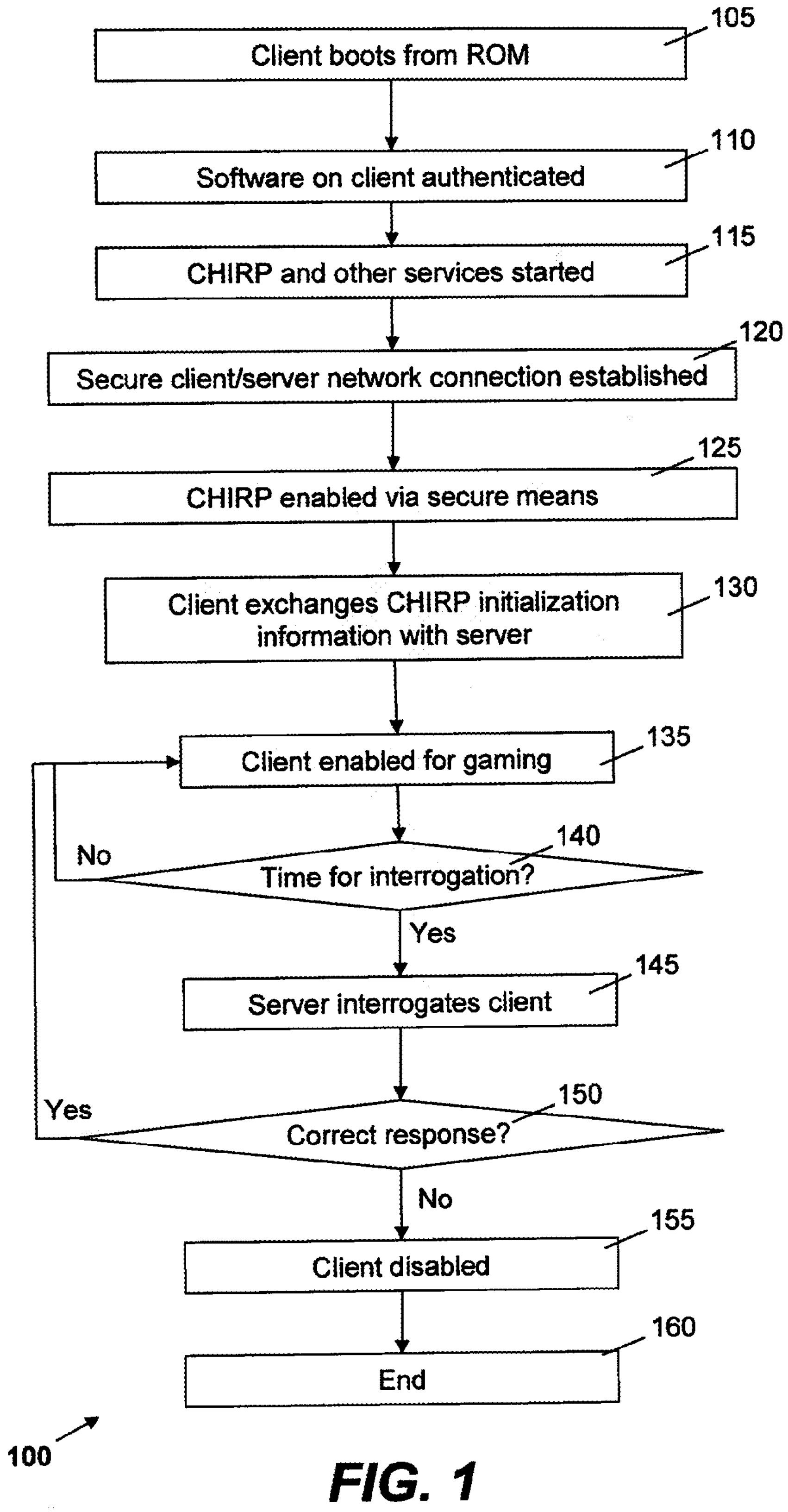
FIG. 1 is flow chart that outlines steps of various implementations.

An overview of some implementations will now be described with reference to FIG. 1. In method 100, beginning at the powered-down state (off), a client device (such as a thin client or a "fat client" such as a personal computer, a gaming machine, etc.) boots from a local read-only memory ("ROM"). (Step 105.) In some implementations, removable storage may be used to initiate the bootstrap process, such as a Universal Serial Bus ("USB") flash drive or another bootable medium such as a floppy disk or an optical disk.

Alternatively, the client device may boot by using network boot services (such as a Preboot Execution Environment ("PXE") process, preferably over a physically secure and trusted connection), according to the client device's design and functional requirements. For example, disk operations (such as requests to read/write disk sectors) may be virtualized and translated into a network protocol. Disk operations may be translated into corresponding network requests and processed by a service or daemon running on the server side. Such a boot process may be comparable, for example, to that used by Neoware Image Manager™, Ardence™ and various "boot over iSCSI (Internet Small Computer System Interface)" products.

Software loaded on the client at boot time and at subsequent machine reconfigurations, including but not limited to gaming and CHIRP software, should be authenticated after downloading using known secure authentication methods. (Step 110.) In some embodiments, such authentication may be accomplished via a direct wired connection to the server, via USB or via other secure means.

In this example, a CHIRP daemon or system service is started during the boot process. (Step 115.) Other services, such as networking services, may also be initiated. Here, a secure network connection is established between one or more devices of a central system (e.g., one of a casino's servers) and the client device. (Step 120.) The secure network connection may be established, for example, via Secure Sockets Layer ("SSL"), Transport Layer Security ("TLS"), Secure Shell ("SSH"), Virtual Private Network ("VPN") or another secure protocol. Examples of relevant devices and systems are described below.

For the sake of convenience, a device of a central system that performs some CHIRP functionality may be referred to herein as a "CHIRP server" or the like. However, it will be recognized that other types of devices, such as host devices, arbiters, other network devices, etc., may be involved in the processes described herein. Examples of some such devices are described in detail below. Moreover, a device functioning as a CHIRP server may also perform other functions. In some such implementations, one blade of a blade server will be configured to perform the functionality of a CHIRP server and another blade will be configured to perform other functions, e.g., functions related to wager gaming.

In some embodiments, e.g., in embodiments wherein links may be active for a prolonged period of time (as with fixed-place machines), a temporal key integrity protocol ("TKIP") feature may be enabled to update session keys on a periodic basis. Using a TKIP feature in addition to a CHIRP identification system can increase the security of gaming session data.

After secure networking has become operational (but preferably before the client is made available to a gaming customer), CHIRP is enabled via secure means. (Step 125.) For example, CHIRP may be enabled via a direct connection to a CHIRP server, a host device, etc. Alternatively (or additionally), CHIRP may be enabled via a code entered on a device (e.g., on a client device). The code is preferably entered by a trusted person, such as an authorized attendant.

In this example, after CHIRP is enabled the client device exchanges CHIRP initialization information with the CHIRP server (step 130). The CHIRP server may, e.g., provide a first random integer A to the client and also retain that value for the CHIRP server's own subsequent use. Some examples described herein (e.g., as described below with reference to FIGS. 4 and 5) involve 16 bit integers, but the system can be designed to accommodate any desired integer size. Moreover, other implementations may use exchanging information in other forms, e.g., as alphanumeric codes.

Due to the frequent updates that are performed in preferred implementations of the CHIRP protocol, the use of integers larger than 16 bit integers may not provide much greater security. However, the use of larger integers will require one or more additional bytes of memory for storage and an increase in processing and network resources for data transfer, storage and manipulation.

If predetermined criteria are met (e.g., if a player provides sufficient indicia of credit, if a mobile client is in a location wherein a desired game is permitted, etc.), the client is enabled for gaming functionality after the exchange of CHIRP initialization information. (Step 135.) Thereafter, when it is determined to be time to interrogate the client (in step 140), the CHIRP server interrogates the client by transmitting another random integer B to the client, preferably of identical size to the previously-transmitted random integer A. (Step 145.) The CHIRP server or another device may make the determination of step 140. In some implementations, the interrogation process may start before the client is fully enabled for gaming functionality.

The CHIRP server may interrogate the client at different time intervals, according to the implementation. The time intervals may be selected, at least in part, according to the desired level of security. In some implementations, the interval between subsequent interrogations can be as short as a fraction of a second or as long as several minutes (or longer). In general, the shorter the time interval between interrogations, the higher the level of security that will be provided.

In some implementations, the time intervals between interrogations may include a measure of randomness. For example, a CHIRP server may interrogate a client at a predetermined time interval (e.g., approximately once every second), plus or minus half a second. The actual interrogation time may be randomly selected (e.g., by a random number generator of the CHIRP server or another device), within the range of plus or minus half a second.

The client responds to the CHIRP server's interrogation by using the received data to generate and return a response to the server. For example, upon receipt of the second integer B, the client will perform a specified mathematical operation involving the first integer provided by the server and the newly-received second integer and transmit the result back to the server. If the CHIRP server receives the correct response (as determined in step 150), the client will remain enabled for gaming (step 135). In some embodiments, the determination of step 150 is made within a predetermined period of time, such as a predetermined period of time after the response is sent or received. If the CHIRP server does not receive the correct response, the client will be disabled. (Step 155.) For example, the client may receive a command from the CHIRP server to disable a display, an input device or another component used for gaming, to power down, etc. Alternatively, a logic device of the client may be programmed to shut the client off if an expected response (e.g., a subsequent interrogation) is not received from the CHIRP server within a predetermined time. If the client device is disabled and/or shut off, the process ends. (Step 160.)

Figure 2:
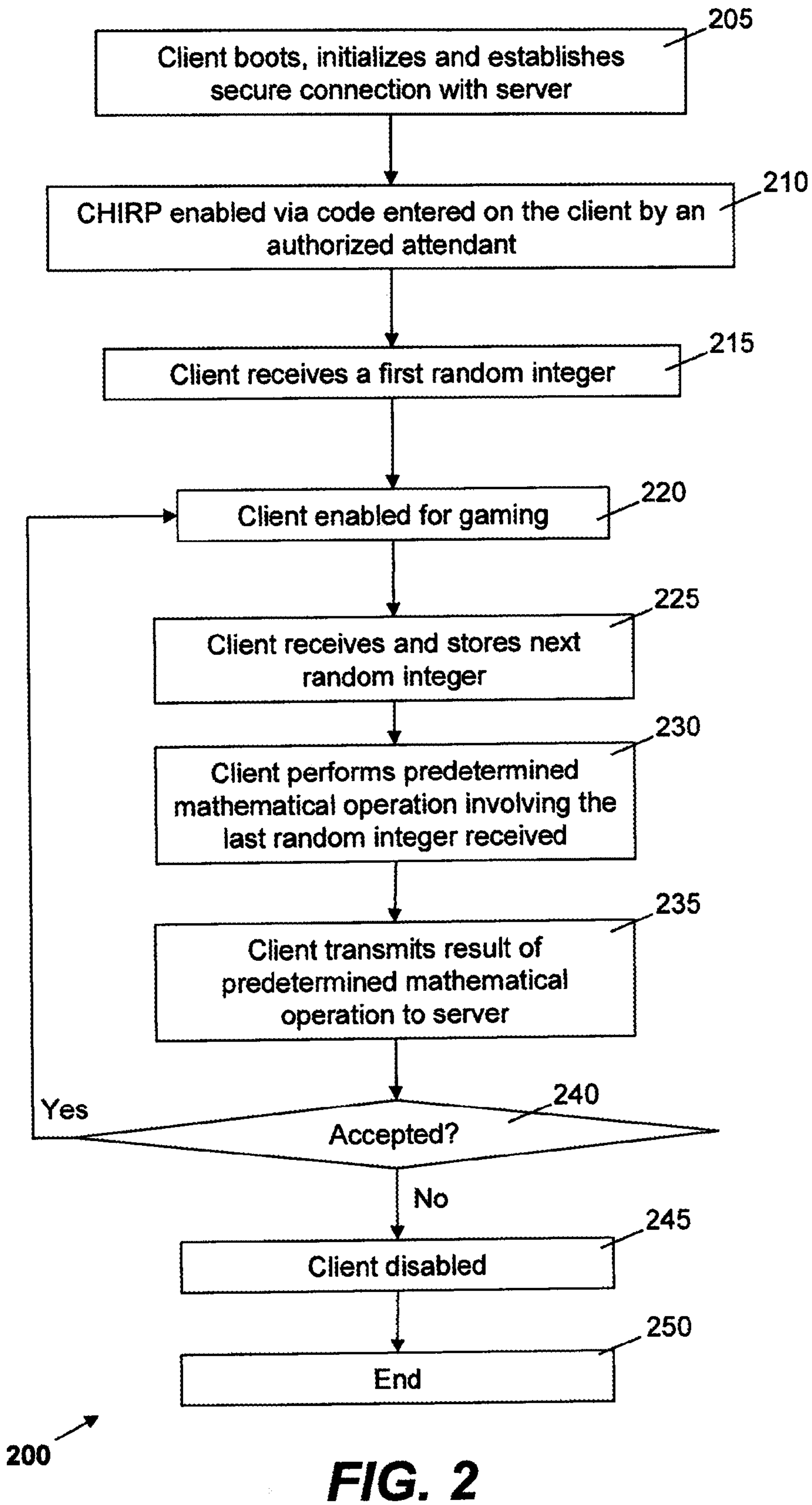
FIG. 2 is flow chart that outlines steps of some methods that may be performed, at least in part, by a client device.

Some implementations of the invention will now be described with reference to FIG. 2. It will be appreciated that the steps of method 200 (as with other methods shown and described herein) are not necessarily performed in the order indicated. It should also be understood that the methods of the invention may include more or fewer steps than are indicated. The steps of method 200 may be performed, at least in part, by a client device in a network, such as a mobile gaming device, a thin client, a "thick" client such as a fixed-place electronic wager gaming machine, etc. For example, the steps of method 200 may be performed, at least in part, by a logic system of a gaming device, the logic system comprising one or more logic devices such as processors, programmable logic devices, firmware, etc.

In step 205, the client device initializes and establishes a secure connection with a CHIRP server. Here, the client device is a mobile device and a thin client. In this example, CHIRP is enabled via a code that is entered on the mobile device by an authorized attendant. (Step 210.) For example, the code may be entered on the mobile device by a casino employee who has been entrusted with this task. The employee may, for example, be responsible for providing mobile gaming devices owned by a casino to selected casino patrons.

In step 215, the mobile device receives a first random integer. In this example, the mobile device may receive the first random integer from the CHIRP server via a wireless network interface. The mobile device is enabled for gaming. (Step 220.) The mobile device may be automatically enabled for gaming, e.g., by a processor of the mobile device according to a command from the CHIRP server and/or upon receiving the first random integer (or other code). However, in this example, the mobile device is manually enabled for gaming by the attendant.

In step 225, the mobile device receives a subsequent random integer from the CHIRP server. In this example, the mobile device then performs a predetermined mathematical operation involving the last two random integers received. (Step 230.) Because the process is beginning, the last two random integers received are also the first two random integers received. Preferably, the result of this predetermined mathematical operation should be relatively unique (to thwart a "lucky guess") but reasonably bounded. For the same reason, consecutive results are preferably well distributed within prescribed bounds, so as to avoid clustering.

The predetermined mathematical operation may take various forms. For example, the predetermined mathematical operation may involve modulo addition or multiplication. However, operations such as these require several distinct sub-operations and are therefore not as computationally efficient as some others. Moreover, in some implementations, the predetermined mathematical operation may involve more or fewer than two numbers.

In some preferred embodiments, as here, the predetermined mathematical operation involves a bitwise exclusive OR ("XOR") performed on two integers. Unlike encryption or hash computation, both of which may consume considerable computing resources, a bitwise XOR calculation is a single operation in most high-level programming languages (such as C++) and is therefore extremely fast. Despite the simplicity of this mathematical operation, the necessity for knowledge of the prior data value by the client coupled with the frequent updating of these prior values makes it very difficult to substitute another machine which lacks that knowledge. This difficulty is increased for implementations that provide CHIRP over a secure connection.

In this example, the first random integer (received in step 215) is 27309 in decimal form, or 0110101010101101 in binary form. The second random integer (received in step 225) is 07312 in decimal form or 0001110010010000 in binary form. Performing the predetermined mathematical operation of XOR on these two numbers yields 30269 in decimal form, which equals 0111011000111101 in binary form.

FIG. 3A illustrates a simplified version of a data structure 300*a* that may be stored in a memory of the mobile device at this time. Field 305 indicates the type of predetermined mathematical operation that will be performed, which is an XOR operation in this instance. Field 310 indicates the last number received (the second random integer received in step 225) and field 315 indicates the penultimate number received (the first random integer received in step 215). The result of the predetermined mathematical operation is indicated in field 320.

The result of the predetermined mathematical operation is transmitted to the CHIRP server (preferably over a secure link). (Step 235 of FIG. 2.) In some implementations, the result of the predetermined mathematical operation is stored by the client. In some such implementations, the client may store the result in order to allow a subsequent re-transmission of the result, e.g., if there is a dropped packet.

If the CHIRP server determines that the mobile device has transmitted the proper result of the predetermined mathematical operation, the client will remain enabled for gaming. (Step 220.) The mobile device will receive another random integer (step 225). In this example, the mobile device receives the number 0011101010011011.

In some implementations, the result of the last predetermined mathematical operation may replace the initial integer in memory. For example, the client device may store the result of the last predetermined mathematical operation in field 315 of data structure 300 and access the result for subsequent iterations of the predetermined mathematical operation. In such implementations, the client device may perform the predetermined mathematical operation using the random integer most recently received and the last result of the predetermined mathematical operation.

However, in this example the mobile device performs a predetermined mathematical operation involving the last two random integers received. (Step 230.) At the time depicted in FIG. 3B, the mobile device has replaced the previous value in penultimate number received field 315 with the previous value in last number received field 310. The mobile device has replaced the previous value in last number received field 310 with most recently received random integer, the number 0011101010011011.

At the time represented by data structure 300*b*, the predetermined mathematical operation is still operation "A," which is an XOR operation. In some implementations, the predetermined mathematical operation may change over time. For example, the predetermined mathematical operation may change at predetermined times and/or upon receipt of an indication from the CHIRP server.

Accordingly, the mobile device has performed another XOR operation using the values in fields 310 and 315. The result, indicated in response field 320, is transmitted to the CHIRP server in step 235 of FIG. 2. If the CHIRP server determines that the mobile device has transmitted the proper result, the mobile device will remain enabled for gaming. (Step 220.) If not, the mobile device will be disabled. (Step 245.) The process ends in step 250.

Figure 4:
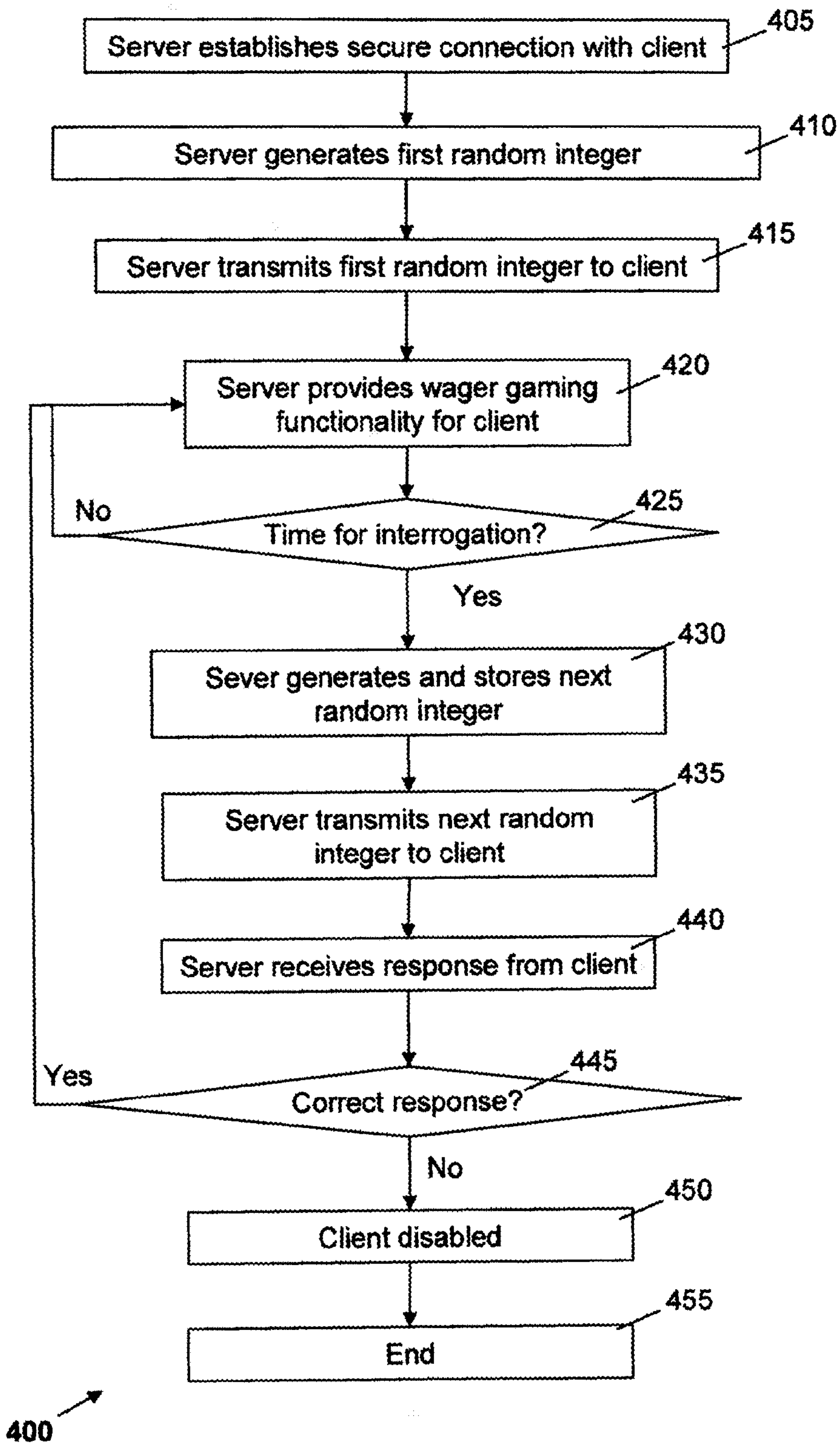
FIG. 4 is flow chart that outlines steps methods that may be performed, at least in part, by a device of a central system.

Some related implementations of the invention will now be described with reference to FIG. 4. The steps of method 400 may be performed, at least in part, by one or more devices in a network, such as a server, an arbiter, a host device, etc. As noted above, any such device may be referred to herein as a "CHIRP server." For example, the steps of method 400 may be performed, at least in part, by a logic system of a CHIRP server. The logic system may include one or more logic devices (e.g., processors, programmable logic devices and/or firmware), etc.

In step 405, the CHIRP server establishes a secure connection with a client device, e.g., as described above. In step 410, the CHIRP server generates a first random integer. (It will be appreciated that, in alternative implementations, another device could generate random integers used by the CHIRP server.) The CHIRP server transmits the first random integer to the client. (Step 415.)

In this example, the client is some type of thin client, which may be a stationary thin client or a mobile device. Accordingly, one or more servers of a casino's gaming network provide desired wager gaming functionality to the client in step 420. In this example, the wager gaming functionality includes, but is not limited to, wager game outcome determinations, bonus determinations, etc.

In step 425, the CHIRP server determines whether it is time to interrogate the client device. Such a determination may be made, e.g., by implementing a predetermined rule set, by reference to a data structure, or in any other appropriate fashion.

In this example, the CHIRP server determines whether it is time to interrogate the client device by reference to a data structure such as data structure 500 of FIG. 5. The values, numbers and types of fields, etc., of data structure 500, including but not limited to the interrogation frequency values, are merely examples and are not limiting in any way. A data structure such as data structure 500 may be stored, e.g., in a memory of (or at least accessible to) a CHIRP server.

In the depicted implementation, the CHIRP server interrogates different types of client devices at different time intervals. Client types are indicated in field 510 and corresponding interrogation frequencies are indicated in field 515. In this example, the time intervals are configurable by a casino operator and have been selected, at least in part, according to desired levels of security. Here, mobile clients are interrogated most frequently, stationary thin clients are interrogated less frequently and stationary "thick" clients, such as stationary electronic wager gaming machines, are interrogated least frequently.

As previously noted, the indicated time intervals may include a measure of randomness in some implementations. For example, the CHIRP server may interrogate an EGM/thick client at a first predetermined time interval of approximately three seconds, plus or minus a second predetermined time interval (e.g., of one second). The actual interrogation time may be randomly selected (e.g., by a random number generator of the CHIRP server or another device), within the second predetermined time interval of plus or minus one second.

As noted in field 525, more than one type of predetermined mathematical operation may be performed according to this CHIRP implementation. Here, operation "A," which is an XOR operation, applies to CHIRP procedures for mobile devices and stationary thin clients. Another type of predetermined mathematical operation, "C," will be used for stationary electronic wager gaming machines and other thick clients.

In this example, a client code is used to differentiate the clients in communication with a CHIRP server. (See field 505.) Responses received from a client preferably include the client code or another such identifier, e.g., in a packet header, a source address field, etc. In some implementations, clients may be identified according to another type of code or address, e.g., according to a media access control ("MAC") address. Client status (here, "active" or "inactive") is indicated in field 520.

When the CHIRP server determines that it is time to interrogate a client device, the CHIRP server (or an associated device) generates another random integer. This random integer is stored (step 430 of FIG. 4) and is transmitted to the client device. (Step 435.) Here, the last two random numbers provided to each client device are stored in sub-fields of field 530. (See FIG. 5.) In alternative implementations, more than one field may be used to store the last numbers provided.

In this example, the next expected response is computed in advance (i.e., before the response is actually received from the host device) and is stored in field 535. Here, for example, the last two numbers sent to stationary thin client A38U4 were 0110101010101101 and 0001110010010000. The CHIRP server has performed an XOR operation (operation A, as noted in corresponding field 525) to yield a result of 0111011000111101. This value has been stored in field 535, to allow a convenient evaluation of the next response received from stationary thin client A38U4. In alternative implementations, the expected response may be computed at other times, e.g., after receipt of an actual response from a client device.

When a client response is received in step 440 (see FIG. 4), the CHIRP server determines whether the response is correct. (Step 445.) If so, wager gaming services will continue to be provided to the client device, provided that other conditions are satisfied (e.g., that sufficient credit is available for wager gaming, that a mobile device is in a location wherein wager gaming is legal, etc.). (Step 420.) In some implementations, a CHIRP server may send a confirmation to one or more other servers that are providing wager gaming services to the client device.

If the CHIRP server determines in step 445 that a response received from a client device is not correct, the client device will be disabled. (Step 450.) For example, the CHIRP server may send a command to the client device indicating that the client device should be disabled and/or powered off. In some preferred implementations, the state of client processes active at that time are saved and logged. Saving the state can enable a gaming session to be resumed without difficulty and may be desirable (or even required) as part of a wager game auditing procedure. The CHIRP server may send an indication to one or more other servers that no further wager gaming services should be are provided to the client device until further notice. In some preferred implementations, the client will not be provided gaming services until CHIRP is re-enabled for the client, e.g., after re-authorization by an attendant with the proper enabling code. The process ends in step 455.

In some implementations, if the CHIRP server receives an incorrect response, the CHIRP server may prompt the client device to re-transmit the last response instead of causing the client device to be immediately disabled. Such implementations may avoid disabling client devices due to faulty transmission of a valid response.

Figure 6:
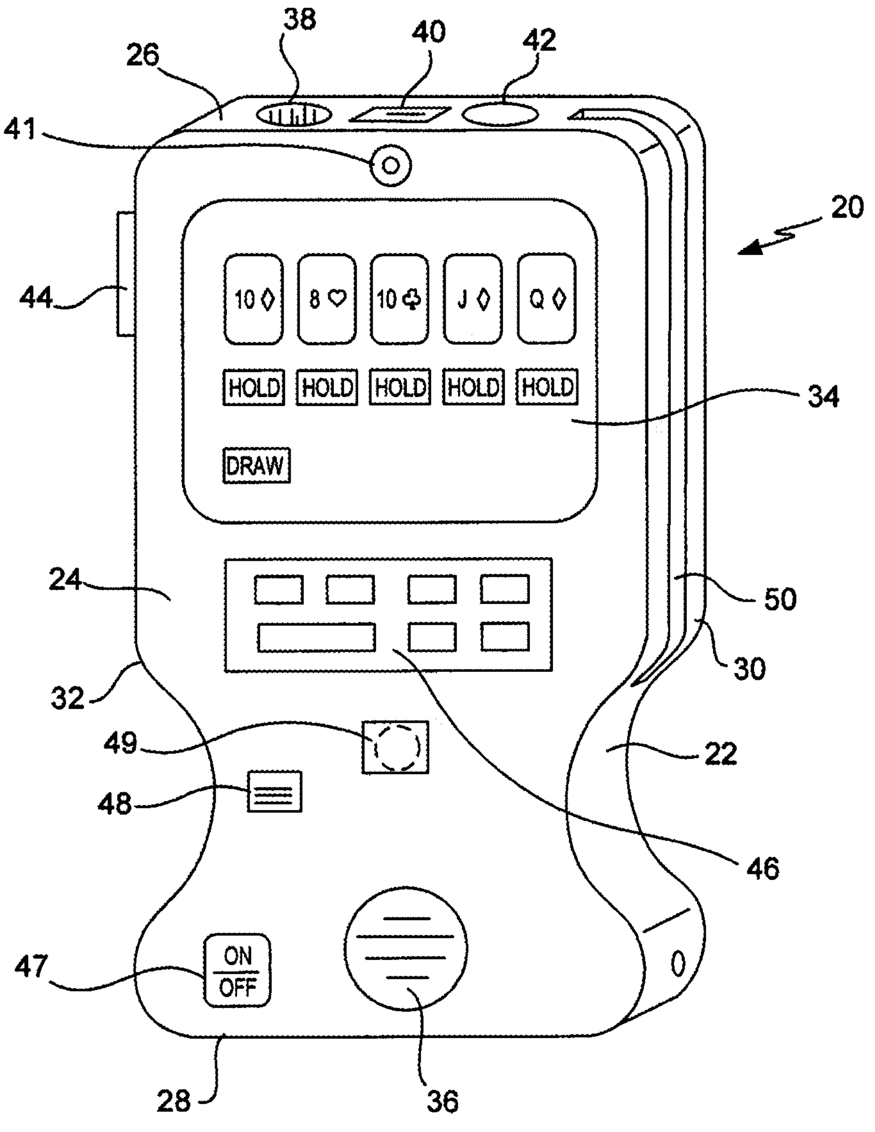
FIG. 6 illustrates one example of a mobile device.

FIG. 6 illustrates an example of a mobile gaming device that may be used to implement some aspects of the invention. In general, mobile device 20 includes a body or housing 22. Body 22 may be constructed from a wide variety of materials and be in one of many shapes. In one embodiment, the body 22 is constructed from one or more molded polypropylene or other plastic components. The body 22 may be constructed of metal or a wide variety of other materials. As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located as described below.

In a preferred embodiment, mobile device 20 is adapted to present video and sound game data to a player. As illustrated, mobile device 20 includes a display 34. The display is located in the front face 24 of the body 22, thus facing upwardly towards a player. In a preferred embodiment, the display 34 comprises a liquid crystal display ("LCD"), and in particular, an LCD permitting touch-screen input. It will be appreciated that other types of displays may be provided. In this example, mobile gaming device 20 also includes a sound-generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30, 32 of the body 22.

In preferred embodiments, mobile device 20 is adapted to send and/or receive data from another device. As such, mobile device 20 includes one or more data input and/or output devices or interfaces. In some embodiments, mobile device 20 includes a Recommended Standard 232 ("RS-232") data port 38 for transmitting and accepting data, such as through a cable extending between mobile device 20 and another device, such as a computer. In some embodiments, mobile device 20 includes a Universal Serial Bus ("USB") data port 40 for transmitting and accepting data, e.g., through a cable. In some embodiments, mobile device 20 includes an infrared data transmitter/receiver 42 for transmitting information in wireless, infrared light form. In some embodiments, mobile device 20 includes a wireless communication device 44, such as a wireless communication device/interface operating at radio frequency, e.g., in accordance with the IEEE-802.11x or the Bluetooth standard. In some embodiments, mobile device 20 includes hardware for operating according to one or more near-field magnetic ("NFM") standards.

A user may provide input to mobile device 20, e.g., for playing a wagering game or for a non-gaming service. As stated above, one means of input may be through the display 34. The display 34 may also be arranged to accept input via a stylus or another device. In one embodiment, mobile device 20 includes a keypad 46. In one or more embodiments, the keypad 46 is a sealed keypad having one or more keys or buttons. Mobile device 20 can include a microphone 48 arranged to accept voice input from a player.

Other input devices may alternatively be provided or be provided in addition to those input devices described. For example, a player may be permitted to provide input through a joystick (not shown). The joystick may comprise a control element associated directly with the body 22 of mobile device 20. Alternatively, the joystick may be separate from mobile device 20, and then be placed in communication therewith, such as by plugging in the joystick to a data port of mobile gaming device 20. A smart card reader, optical reader or other input device may be provided for reading information from another element, such as a card, ticket or the like. Mobile device 20 may also include one or more other input devices, such as a keyboard, a thumb pad and/or mouse.

In one embodiment, mobile device 20 includes an image collection device 41, such as a camera. The image collection device 41 may be used, for example, to capture the image of a user or player of mobile device 20. This image information may be used for security or authentication purposes.

Mobile device 20 may also include a fingerprint scanner 49 and/or another biometric device. In one embodiment, as illustrated, the fingerprint scanner 49 may be located behind or beneath a user input button, such as a "spin" or "draw" button. In this manner, a player's fingerprint may be obtained without the user or player having to be consciously aware that a fingerprint is being obtained. (However, the player may be informed, for example during device registration and/or check out, that a fingerprint can be taken when the buttons are pressed). As described below, a player's scanned fingerprint information and/or other biometric information may also be used for authentication purposes.

Mobile device 20 may also include a card reader 50. As illustrated, the card reader 50 is located in a side 30 of the body 22 of mobile device 20. In some embodiments, the card reader 50 comprises a magnetic stripe reader for reading information from a magnetic stripe of a card. Mobile device 20 may also include a radio frequency device (such as a radio frequency identification ("RFID") reader or the like) configured to read data from and/or to write data to a "smart card" such as an RFID card. Mobile device 20 may also be configured to read data from and/or to write data to a portable memory module (e.g., a USB dongle).

As illustrated, the card reader 50 includes a slot that is positioned in the side 30 of mobile device 20. Mobile device 20 may be battery-powered, such as with a rechargeable battery pack. An ON/OFF button 47 may be provided for controlling the power to mobile device 20. As described in greater detail below, mobile device 20 may be docked at or otherwise associated with a free-standing electronic gaming machine or other gaming device. At such times that mobile device 20 is docked, the internal battery of the device can be recharged for later use in an undocked or "remote" mode, as will be readily appreciated. Appropriate detection provisions, warnings and safeguards for a low battery status in mobile gaming device 20 while in such a remote mode can also be provided.

Figure 7:
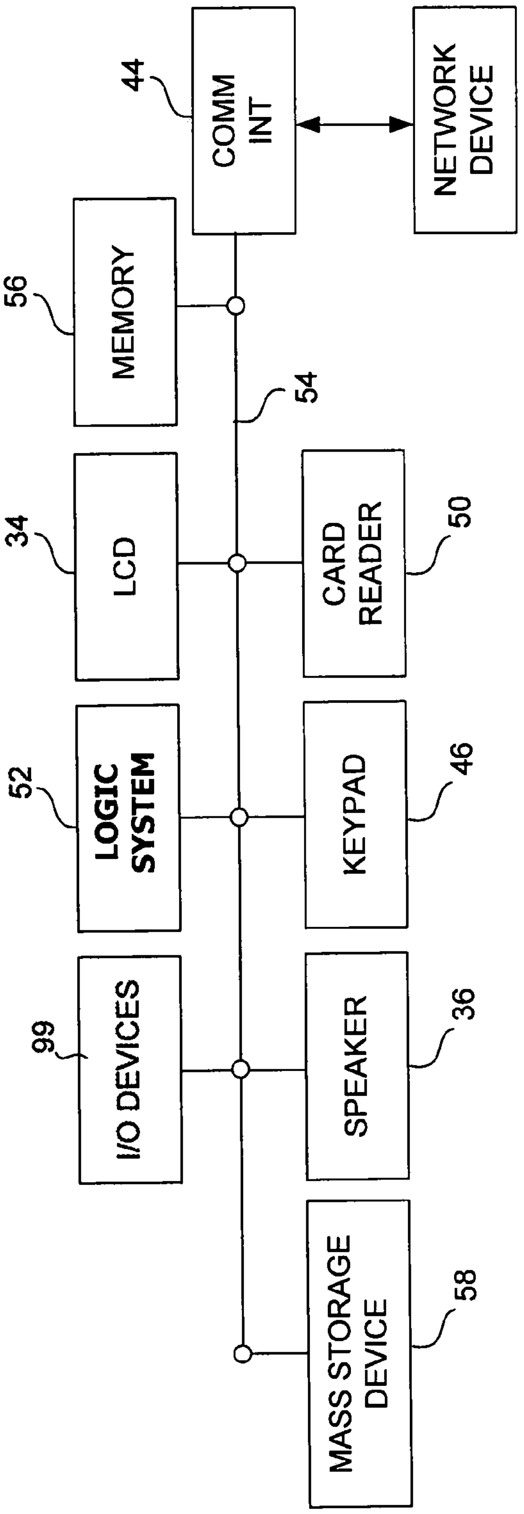
FIG. 7 is a block diagram that provides examples of components that may be used in a mobile device.

Preferably, mobile gaming device 20 includes control means for controlling the operation of the device, including accepting input and providing output. One embodiment of such a control means is illustrated in FIG. 7. It will be appreciated that various other configurations of hardware, software and/or firmware may be used to implement mobile devices suitable for use according to the present invention. As illustrated, mobile gaming device 20 preferably includes a computing environment serving as the control means. The computing environment includes a logic system 52. Logic system 52 preferably comprises at least one logic device, such as a microprocessor.

The capabilities of logic system 52 may vary widely according to the implementation. Preferably, logic system 52 is at least able to perform client-side CHIRP functionality such as that described herein, e.g., as described above with reference to FIGS. 1-5. In some "thin client" implementations, logic system 52 may execute software that depends, to a greater or lesser extent, on one or more central devices for processing activities. In some such implementations, only rudimentary game software activities are performed by logic system 52. For example, logic system 52 may be primarily responsible for receiving input from a user, providing such input to a central system and controlling display 34 and speaker 36 according to instructions received from the central system. In other implementations, logic system 52 may perform increased gaming functionality and may even be involved in determining game outcomes.

Similarly, the capabilities of memory 56 may vary widely according to the implementation. The memory 56 may comprise, e.g., dynamic random access memory ("DRAM"), synchronous DRAM and/or another form of random access memory. The memory 56 may have other forms as well, such as electronically erasable programmable read only memory ("EEPROM"). Preferably, the memory 56 is of the type that permits data to be written thereto and read therefrom.

In this example mass storage device 58 is also accessible via bus 54. The mass storage device 58 may be of the read-only type (such as a CD or DVD optical drive) or may be of the read-and-write variety such as a hard drive, flash memory, compact flash, or CD/DVD-R/W drives. Some alternative implementations of mobile gaming device 20 do not include a mass storage device 58.

In this example, central processing unit 52 is associated with a bi-directional system bus 54. The system bus 54 may contain, for example, address lines for addressing a video memory or main memory. In addition, the system bus 54 preferably includes a data bus for transferring data between and among components associated with the bus 54. Alternatively, multiplex data/address lines may be used instead of separate data and address lines. Other implementations may involve other architectures, including but not limited to input/output architectures.

The display 34 is communicatively coupled to the bus 54. In one embodiment, a video memory (not shown) is provided in association with the bus 54. The video memory may be, for example, dual-ported video random access memory. The video memory is preferably communicatively coupled to, and arranged to drive, the LCD display 34. Of course, the video memory might be communicatively coupled to a CRT or other suitable display device.

As illustrated in FIG. 7, the variety of input and output devices can be configured for communication with the system bus 54 and thus with other components. As illustrated, the speaker 36, keypad 46 and card reader 50 are configured for communication with the system bus 54. A variety of data input/output devices ("I/O Devices") 99 may also configured for communication with the system bus 54, such as, though not specifically illustrated, the RS-232 port 38, the USB 40, and the infrared communication transmitter/receiver 42 depicted in FIG. 6. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with mobile device 20, as now known or later developed. Moreover, some alternative architectures are not bus-based.

In some implementations, mobile device 20 includes a wireless, radio frequency communication interface 44. For example, such an interface may operate in accordance with the IEEE 802.11x or Bluetooth standards. In another embodiment, communication interface 44 may operate according to NFM communication standards that enable device 20 to receive and transmit NFM signals. The architectures and protocols of these and other wireless communication interfaces are well known in the wireless technology field. In general, however, interface 44 permits two-way data communication. As described in detail, mobile device 20 may be permitted to communicate with a wide variety of devices/systems, including at least one device associated with a gaming network, such as an RF transmitter or an NFM antenna. Accordingly, mobile device 20 may be configured to send data and receive data, including program code, through the communication interface 44 (or the other input/output devices, such as the infrared transmitter/receiver).

In some implementations, a gaming server may transmit requested code for an application via a transceiver to the communication interface 44 of mobile device 20. The received code may be executed by the central processing unit 52 as it is received and/or be stored in the memory 56 and/or mass data storage device 58 for later execution. In one or more embodiments, the memory 56 may comprise a smart card or similar easily removable (and replaceable) device. In such event, data, such as operating code, may be associated with mobile device 20 via a CD-ROM placed in a CD-ROM drive or by insertion of a coded smart card or portable memory module.

Although the foregoing exemplary mobile gaming device 20 is fairly specific with respect to many details, it will be readily appreciated that a wide variety of similarly suitable devices can also be used as a mobile gaming device. Other exemplary mobile gaming devices and features thereof are provided in commonly owned U.S. Pat. No. 6,846,238, issued to Wells, and entitled "Wireless Game Player", which is incorporated herein by reference in its entirety. Additional features and applications for a mobile gaming device can also be found in commonly owned U.S. patent application Ser. No. 10/937,990 by Nguyen et al., entitled "Apparatus and Methods for Wireless Gaming Communications", in commonly owned U.S. patent application Ser. No. 11/472,585 by Oberberger et al., entitled "Mobile Device for Providing Filtered Casino Information Based on Real Time Data" and in commonly owned U.S. patent application Ser. No. 11/155,702 by Nguyen et al., entitled "Virtual Leash for Personal Gaming Device", all of which are also incorporated herein by reference.

It will be appreciated that not all items and features of the above and incorporated mobile gaming devices may be required for a given mobile gaming device or associated system, and that other items and features not disclosed may also be included. In some cases, a mobile gaming device can be provided by the casino or gaming operator, such as through sales, rentals or checkout procedures, while in other instances, a suitable mobile gaming device can be an outside device that is provided by the player or another third party. Such a privately owned outside mobile gaming device can be, for example, a personal desk or digital assistant ("PDA"), laptop, tablet PC, MP-3 players, cell phone (e.g., a Blackberry® or Treo® type phones), video gaming consoles, or any other similarly suitable device. As discussed herein, it will be understood that use of the term "mobile gaming device" can refer to the mobile gaming device 20 disclosed above, as well as any other suitable device that can serve as a mobile gaming device for any purpose of the present invention.

Similarly, it will be appreciated that a variety of "thin client" devices may be used to implement many of the methods described herein. Some thin clients may be mobile devices and vice versa. As such, there may be some overlap in the features and functionality of mobile device components (e.g., as described above with reference to FIG. 7) and those of thin clients. However, some thin clients may lack features illustrated in FIG. 7, such as a mass storage device; some such devices may store little or no data persistently. Moreover, some thin clients may have limited processing capabilities and may depend primarily on a server or other device of a central system for processing activities. Conversely, some mobile gaming devices may be relatively "thick," i.e., such devices may have significant processing capabilities and may be configured independently to provide various functions, including but not limited to gaming functions, that may not be provided by a thin client.

Some thin clients may be configured to execute user interface software, possibly one or more frequently used application(s) an operating system (e.g., a networked operating system) and little or nothing else. For example, a thin client may perform simple input/output tasks to communicate with the user, such as drawing a dialog box on a display, receiving user input, transmitting related information to a central device, etc. The necessary software may be loaded from a local drive, from a central device at the time of initialization, or as needed. By reducing the demands on the thin client, such a device can be relatively inexpensive and low-powered, resulting in lower purchase costs and lower operating costs as compared to thick devices. Performing most processing and storage at the central system and/or "cloud" level, can result in easier system management, lower costs and simplified security measures.

Other implementations of the invention may involve thin clients that are intended to be relatively stationary. For example, some thin clients may be intended for use in a particular location, e.g., as part of a bank of gaming machines at a casino, as a desktop computer, etc. Some such thin clients may have a form factor and overall appearance of an ordinary electronic gaming machine. Such thin clients may include some of the features of electronic gaming machines described elsewhere herein, e.g., bill validators, ticket readers or other credit accepting/dispensing devices, displays, user interfaces (such as buttons, a touch screen, etc.). However, such thin clients may be configured to operate in cooperation with one or more central devices, such as game servers, which determine game outcomes and provide other related functionality. As such, functionality may be apportioned between the thin client and the central device(s) in any convenient manner.

Other types of thin clients may be adapted to provide some methods of the present invention. For example, a commercially available product such as a device from the HP Compaq™ or Neoware™ families of products may be adapted to perform some methods described herein.

As noted above, the term "thin client" as used herein may refer not only to a thin client as the term is generally known in the art, but also to a more versatile device and/or related software, such as a diskless node or a hybrid client. For example, a diskless node may use its own CPU and RAM to run software, but may or may not store data persistently. In general, such persistent storage may be performed by a server, a network storage device, etc.

As such, thin clients may be client computers and/or client software that depend, at least to some extent, on one or more central devices for processing activities but which may potentially have a range of processing capabilities. Accordingly, the manner in which functionality is apportioned between the client device and a device of a central system (and/or other device(s)) may vary according to the desired implementation of the invention.

Some networks described herein provide methods and devices for managing one or more networked gaming establishments. Such networks may sometimes be referred to herein as server-based gaming networks, Sb™ networks, or the like. Some such gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines, mobile gaming devices, thin clients and/or other devices, such as kiosks, networked gaming tables, player stations, etc.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations (such as interim and final game outcomes, bonuses, etc.) may be made by one or more servers or other networked devices. CHIRP functionality, layer tracking functions, accounting functions and even some display-related functions associated with wagering games may be performed, at least in part, by one or more devices of a central system. For example, a thin client, a mobile gaming device, etc. may be used primarily for receiving player input (including but not limited to wagering input) and some display related operations.

Figure 8:
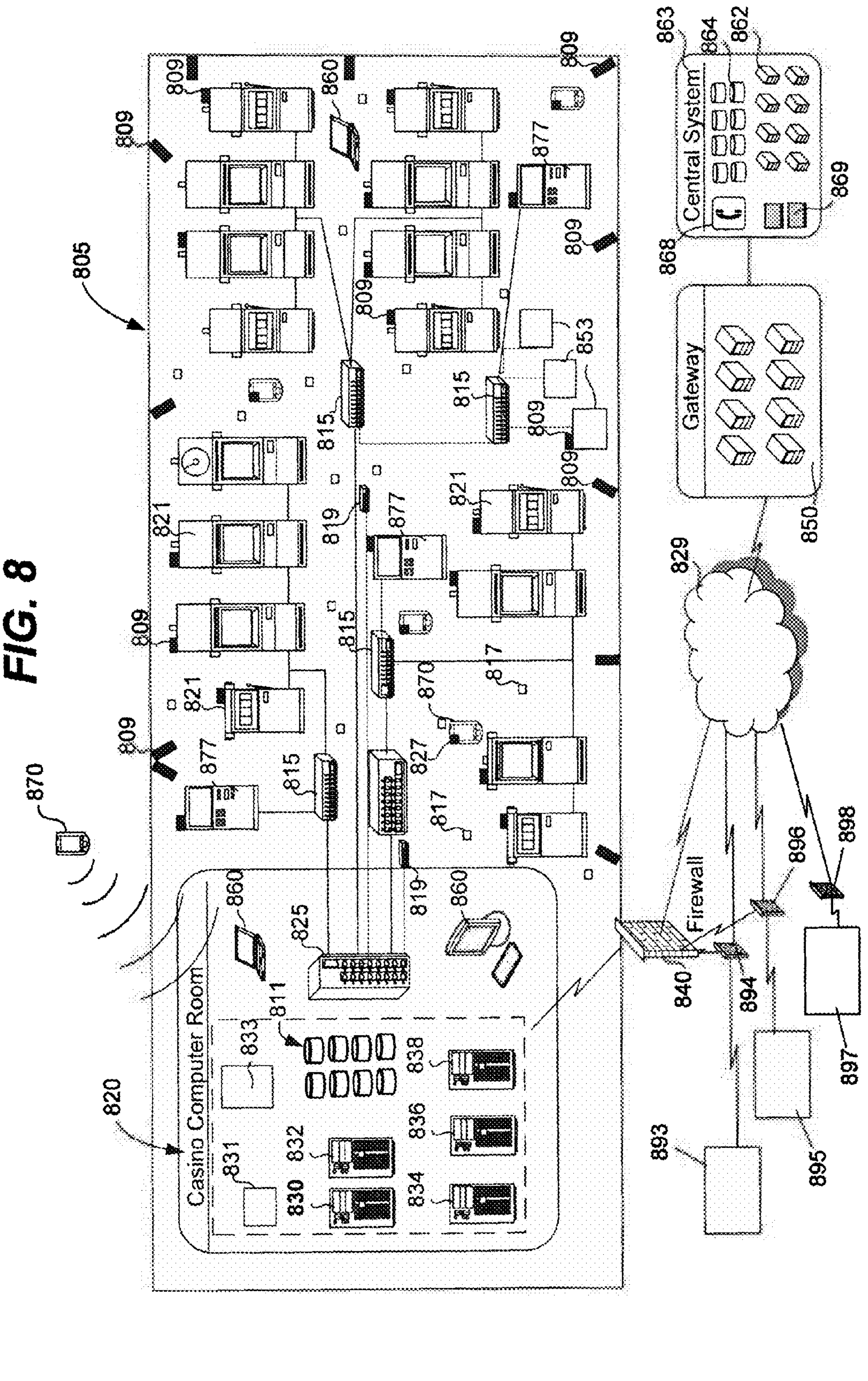
FIG. 8 depicts an example of a gaming establishment and related devices that may be used for some implementations described herein.

One example of an Sb™ network is depicted in FIG. 8. Those of skill in the art will realize that this architecture and the related functionality are merely examples and that the present invention encompasses many other such embodiments and methods.

Here, casino computer room 820 and networked devices of a gaming establishment 805 are illustrated. Gaming establishment 805 is configured for communication with central system 863 via gateway 850, wide area network ("WAN") 829 and firewall 840. Gaming establishments 893 and 895 are also configured for communication with central system 863 via gateway 850, WAN 829 and firewalls 894 and 896, respectively.

In some implementations, gaming establishments may be configured for communication with one another. In this example, gaming establishments 893 and 895 are configured for communication with casino computer room 820. Such a configuration may allow devices and/or operators in casino 805 to communicate with and/or control devices in other casinos. In some such implementations, a server in computer room 820 may control devices in casino 805 and devices in other gaming establishments. Conversely, devices and/or operators in another gaming establishment may communicate with and/or control devices in casino 805.

For example, a server of casino 805 or central system 863 may be provisioned with relatively more advanced software (e.g., 3-D facial recognition software) for patron identification than servers of other networked locations. Such a server may process patron identification requests from devices in casino 805 as well as patron identification requests from devices in gaming establishments 893 and 895.

Here, gaming establishment 897 is configured for communication with central system 863 via gateway 850, WAN 829 and firewall 898. However, gaming establishment 897 is not configured for communication with other gaming establishments. Communications with personnel of central system 863 (not shown) may also be enabled via telephone system 868 or personal computers 869. Some gaming establishments (not shown) may not be in communication with other gaming establishments or with a central system.

Gaming establishment 805 includes multiple gaming machines 821, each of which is part of a bank of gaming machines 821. In this example, gaming establishment 805 also includes a bank of networked gaming tables 853. However, the present invention may be implemented in gaming establishments having any number of gaming machines, gaming tables, etc. It will be appreciated that many gaming establishments include hundreds or even thousands of gaming machines 821 and/or gaming tables 853, not all of which are necessarily included in a bank and some of which may not be connected to a network. At least some of gaming machines 821 and/or mobile devices 870 may be "thin clients" that are configured to perform client-side methods as described elsewhere herein.

Some gaming networks provide features for gaming tables that are similar to those provided for gaming machines, including but not limited to bonusing, player loyalty/player tracking and the use of cashless instruments. Relevant material is provided in U.S. patent application Ser. No. 11/154,833, entitled "CASHLESS INSTRUMENT BASED TABLE GAME PROMOTIONAL SYSTEM AND METHODOLOGY" and filed on Jun. 15, 2005, U.S. Provisional Patent Application No. 60/858,046, entitled "AUTOMATED PLAYER DATA COLLECTION SYSTEM FOR TABLE GAME ENVIRONMENTS" and filed on Nov. 10, 2006, U.S. patent application Ser. No. 11/129,702, entitled "WIDE AREA TABLE GAMING MONITOR AND CONTROL SYSTEM" and filed on May 15, 2005, U.S. patent application Ser. No. 11/425,998 entitled "PROGRESSIVE TABLE GAME BONUSING SYSTEMS AND METHODS", filed Jun. 22, 2006 and U.S. patent application Ser. No. 11/225,299, entitled "UNIVERSAL CASINO BONUSING SYSTEMS AND METHODS" and filed on Sep. 12, 2005, all of which are incorporated herein by reference. Accordingly, software related to such features may be provided and/or controlled, and related data may be obtained and/or provided, according to the present invention.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 853 may be configured for communication with individual player terminals (not shown), which may be configured to accept bets, present an electronic representation of a dealer, indicate game outcomes, etc.

Some gaming networks include electronically configurable tables for playing table games. U.S. patent application Ser. No. 11/517,861, entitled "CASINO DISPLAY METHODS AND DEVICES" and filed on Sep. 7, 2006, describes some such tables and is hereby incorporated by reference. An operator may select a desired game, such as a poker game or a blackjack game, and the table will be automatically configured with geometrical patterns, text, etc., which are appropriate for the desired table game. The desired type of table game may be selected by a control on the table itself or according to instructions received from, e.g., a server or a casino manager via a network interface.

Gaming establishment 805 also includes networked kiosks 877. Depending on the implementation, kiosks 877 may be used for various purposes, including but not limited to cashing out, prize redemption, redeeming points from a player loyalty program, redeeming "cashless" indicia such as bonus tickets, smart cards, etc. In some implementations, kiosks 877 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present invention. For example, in some implementations of the invention, kiosks 877 may be configured to receive information from a patron, e.g., by presenting graphical user interfaces.

In this example, each bank of gaming machines has a corresponding switch 815, which may be a conventional bank switch in some implementations. Each switch 815 is configured for communication with one or more devices in computer room 820 via main network device 825, which combines switching and routing functionality in this example. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various aspects of the invention. IGT has also developed a gaming-industry-specific transport layer called CASH that rides on top of TCP/IP and offers additional functionality and security.

Here, gaming establishment 805 also includes an RFID network, implemented in part by RFID switches 819 and multiple RFID readers 817. An RFID network may be used, for example, to track objects (such as mobile gaming devices 870, which include RFID tags 827 in this example), patrons, etc., in the vicinity of gaming establishment 805. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, all of which are hereby incorporated by reference.

As noted elsewhere herein, some implementations of the invention may involve "smart" player loyalty instruments, such as player tracking cards, which include an RFID tag. Accordingly, the location of such RFID-enabled player loyalty instruments may be tracked via the RFID network. In this example, at least some of mobile devices 870 may include an RFID tag 827, which includes encoded identification information for the mobile device 870. Accordingly, the locations of such tagged mobile devices 870 may be tracked via the RFID network in gaming establishment 805. Other location-detection devices and systems, such as the global positioning system ("GPS"), may be used to monitor the location of people and/or devices in the vicinity of gaming establishment 805 or elsewhere.

Various alternative network topologies can be used to implement different aspects of the invention and/or to accommodate varying numbers of networked devices. For example, gaming establishments with large numbers of gaming machines 821 may require multiple instances of some network devices (e.g., of main network device 825, which combines switching and routing functionality in this example) and/or the inclusion of other network devices not shown in FIG. 8. Some implementations of the invention may include one or more middleware servers disposed between kiosks 877, RFID switches 819 and/or bank switches 815 and one or more devices in computer room 820 (e.g., a corresponding server). Such middleware servers can provide various useful functions, including but not limited to the filtering and/or aggregation of data received from switches, from individual gaming machines and from other devices. Some implementations of the invention include load-balancing methods and devices for managing network traffic.

Storage devices 811, Sb™ server 830, License Manager 831, Arbiter 833, servers 832, 834, 836 and 838, host device(s) 860 and main network device 825 are disposed within computer room 820 of gaming establishment 805. In practice, more or fewer devices may be used. Depending on the implementation, some such devices may reside in gaming establishment 805 or elsewhere.

One or more devices in central system 863 may also be configured to perform, at least in part, tasks specific to the present invention. For example, one or more servers 862, an arbiter, storage devices 864 and/or host devices 860 of central system 863 may be configured to implement the functions described in detail elsewhere herein. These functions may include, but are not limited to, providing CHIRP functionality for devices such as wager gaming machines 821, mobile devices 870, etc. Such CHIRP functionality may include, but is not limited to, functionality described above with reference to FIGS. 1-5. Moreover, some implementations of CHIRP involve a dedicated and opened additional port on a casino local area network ("LAN").

One or more of the servers of computer room 820 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 809, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of computer room 820 to mobile devices 870. Some implementations of the present invention include a plurality of networked cameras 809, which may be video cameras, smart cameras, digital still cameras, etc. In some such implementations, such cameras may provide, at least in part, real-time navigation features such as those described in U.S. patent application Ser. No. 12/106,771, entitled "Real-Time Navigation Devices, Systems and Methods," which is incorporated herein by reference.

Other devices that may be deployed in the network of gaming establishment 805 do not appear in FIG. 8. For example, some gaming networks may include not only various radio frequency identification ("RFID") readers 817, but also RFID switches, middleware servers, etc., some of which are not depicted in FIG. 8. These features may provide various functions. For example, a server (or another device) may determine a location of a mobile device 870 according to the location of an RFID reader that reads an RFID tag 827.

The servers and other devices indicated in FIG. 8 may be configured for communication with other devices in or outside of gaming establishment 805, such as host devices 860, kiosks 877 and/or mobile devices 870, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the invention provide one or more of these servers in the form of blade servers.

Some preferred embodiments of Sb™ server 830 and the other servers shown in FIG. 8 include (or are at least in communication with) clustered CPUs, redundant storage devices, including backup storage devices, switches, etc. Such storage devices 811 may include a "RAID" (originally redundant array of inexpensive disks, now also known as redundant array of independent disks) array, back-up hard drives and/or tape drives, etc.

In some implementations of the invention, many of these devices (including but not limited to License Manager 831, servers 832, 834, 836 and 838, and main network device 825) are mounted in a single rack with Sb™ server 830. Accordingly, many or all such devices will sometimes be referenced in the aggregate as an "Sb™ server." However, in alternative implementations, one or more of these devices is in communication with Sb™ server 830 and/or other devices of the network but located elsewhere. For example, some of the devices could be mounted in separate racks within computer room 820 or located elsewhere on the network. Moreover, it can be advantageous to store large volumes of data elsewhere via a storage area network ("SAN").

Computer room 820 may include one or more operator consoles or other host devices that are configured for communication with other devices within and outside of computer room 820. Such host devices may be provided with software, hardware and/or firmware for implementing various aspects of the invention. However, such host devices need not be located within computer room 820. Wired host devices 860 (which are desktop and laptop computers in this example) and wireless devices 870 (which are PDAs in this example) may be located elsewhere in gaming establishment 805 or at a remote location.

Some embodiments of the invention include devices for implementing access control, security and/or other functions relating to the communication between different devices on the network. In this example, arbiter 833 serves as an intermediary between different devices on the network. Arbiter 833 may be implemented, for example, via software that is running on a server or another networked device. Some implementations of Arbiter 833 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 833 is a repository for the configuration information required for communication between devices on the gaming network (and, in some implementations, devices outside the gaming network). Although Arbiter 833 can be implemented in various ways, one exemplary implementation is discussed in the following paragraphs.

Figure 9:
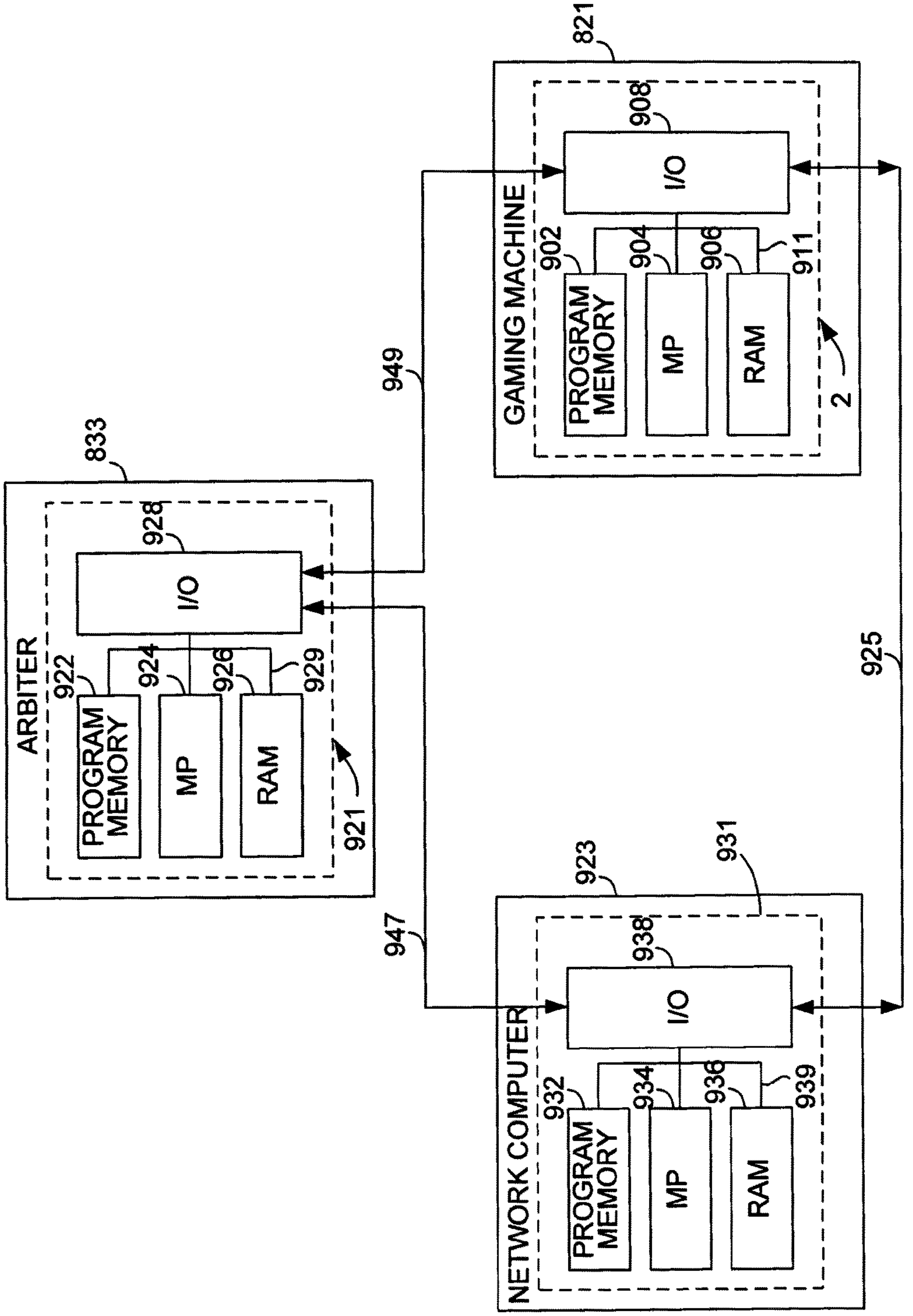
FIG. 9 illustrates an example of an arbiter and related devices that may be used for some implementations described herein.

FIG. 9 is a block diagram of a simplified communication topology between gaming machine 821, network computer 923 and Arbiter 833. Network computer 923 may be, for example, a server or other device within computer room 820 or elsewhere. Although only one gaming machine 821, one network computer 923 and one Arbiter 833 are shown in FIG. 9, it should be understood that the following examples may be applicable to different types of networked devices in addition to gaming machine 821 and network computer 923, and may include different numbers of network computers 923, Arbiters 833 and gaming machines 821. For example, a single Arbiter 833 may be used for secure communications among a plurality of network computers 923 and tens, hundreds or thousands of gaming machines 821. Likewise, multiple Arbiters 833 may be utilized for improved performance and other scalability factors.

Referring to FIG. 9, the Arbiter 833 may include an arbiter controller 921 that may comprise a program memory 922, a microcontroller or microprocessor (MP) 924, a random-access memory (RAM) 926 and an input/output (I/O) circuit 928, all of which may be interconnected via an address/data bus 929. The network computer 923 may also include a controller 931 that may comprise a program memory 932, a microcontroller or microprocessor (MP) 934, a random-access memory (RAM) 936 and an input/output (I/O) circuit 938, all of which may be interconnected via an address/data bus 939. It should be appreciated that although the Arbiter 833 and the network computer 923 are each shown with only one microprocessor, the controllers 921, 931 may each include multiple microprocessors 924, 934. Similarly, the memory of the controllers 921, 931 may include multiple RAMs 926, 936 and multiple program memories 922, 932. Although the I/O circuits 928, 938 are each shown as a single block, it should be appreciated that the I/O circuits 928, 938 may include a number of different types of I/O circuits. The RAMs 926, 936 and program memories 922, 932 may be implemented as semiconductor memories, magnetically readable memories, and/or optically readable memories, for example.

Although the program memories 922, 932 are shown in FIG. 9 as read-only memories (ROM) 922, 932, the program memories of the controllers 921, 931 may be a read/write or alterable memory, such as a hard disk. In the event a hard disk is used as a program memory, the address/data buses 929, 939 shown schematically in FIG. 9 may each comprise multiple address/data buses, which may be of different types, and there may be an I/O circuit disposed between the address/data buses.

As shown in FIG. 9, the gaming machine 821 may be operatively coupled to the network computer 923 via the data link 925. The gaming machine 821 may also be operatively coupled to the Arbiter 833 via the data link 949, and the network computer 923 may likewise be operatively coupled to the Arbiter 833 via the data link 947.

Communications between the gaming machine 821 and the network computer 923 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter Application, the Arbiter 833 may verify the authenticity of devices in the gaming network, including but not limited to devices sending queries and/or remote procedure calls to gaming machines. The Arbiter 833 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 833 may provide encryption keys (session keys) for the communication session to the client via the secure communication channel. Either the host and/or the session key may be provided in response to the request, or may have been previously provided. The client may contact the host to initiate the communication session. The host may then contact the Arbiter 833 to determine the authenticity of the client. The Arbiter 833 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 833 may contact the host regarding the request and provide corresponding session keys to both the client and the host. The Arbiter 833 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Referring again to FIG. 8, the communication link(s) between gaming establishment 805 and central system 863 preferably have ample bandwidth and may, for example, comprise one or more T1 or T3 connections and/or satellite links having comparable bandwidth, etc. Network 829 is the Internet in this example. However, it will be understood by those of skill in the art that network 829 could include any one of various types of networks, such as the public switched telephone network ("PSTN"), a satellite network, a wireless network, a metro optical transport, etc. Accordingly, a variety of protocols may be used for communication on network 829, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

If a host device is located in a remote location, security methods and devices (such as firewalls, authentication and/or encryption) should be deployed in order to prevent the unauthorized access of the gaming network.

Similarly, any other connection between gaming establishment 805 and the outside world should only be made with trusted devices via a secure link, e.g., via a virtual private network ("VPN") tunnel. For example, the illustrated connection between Sb™ server 830, gateway 850 and central system 863 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

Alternatively, a permanent virtual circuit ("PVC") can be established to provide a dedicated and secure circuit link between two facilities, e.g., between a casino and central system 863. A PVC is a virtual circuit established for repeated use between the same data terminals. A PVC could be provided, for example, via AT&T's Asynchronous Transfer Mode ("ATM") switching fabric. Some implementations provide a dedicated line from an endpoint (e.g., from gaming establishment 805) into the ATM backbone. Other implementations provide a connection over another network (e.g., the Internet) between an endpoint and the nearest device of the ATM backbone, e.g., to the nearest edge router. In some such implementations, the fixed-sized cells used in the ATM switching fabric may be encapsulated in variable sized packets (such as Internet Protocol or Ethernet packets) for transmission to and from the ATM backbone.

For security purposes, information transmitted to, on or from a gaming establishment may be encrypted. In one implementation, the information may be symmetrically encrypted using a symmetric encryption key, where the symmetric encryption key is asymmetrically encrypted using a private key. The public key may, for example, be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Some network implementations may use Trusted Network Connect ("TNC"), which is an open architecture provided by the Trusted Network Connect Sub Group ("TNC-SG") of the Trusted Computing Group (TCG). TNC enables network operators to provide endpoint integrity at every network connection, thus enabling interoperability among multi-vendor network endpoints. Alternatively, or additionally, the Secure Internet File Transfer ("SIFT") may be employed. SIFT allows devices to send and receive data over the Internet in a secure (128-bit encryption) method of transport.

Providing secure connections between devices in a gaming network, such as the connections between the local devices of the gaming establishment 805 and central system 863, allows for the deployment of many advantageous features. For example, a customer (e.g., an employee of a gaming establishment) may be able to log onto an account of central system 863 to obtain the account information such as the customer's current and prior account status. Automatic updates of a customer's software may also be enabled. For example, central system 863 may notify one or more devices in gaming establishment 805 regarding new products and/or product updates.

For example, central system 863 may notify server (or other device) in computer room 820 regarding new software, software updates, the status of current software licenses, etc. Alternatively, such updates could be automatically provided to a server in computer room 820 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 863, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 863 and gaming machines in multiple gaming establishments. For example, new or updated software may be obtained by a server in one gaming establishment and distributed to gaming machines in that gaming establishment and/or other gaming establishments. A server in one gaming establishment may perform services, such as patron identification services, in response to a request from a device in another gaming establishment.

Figure 10:
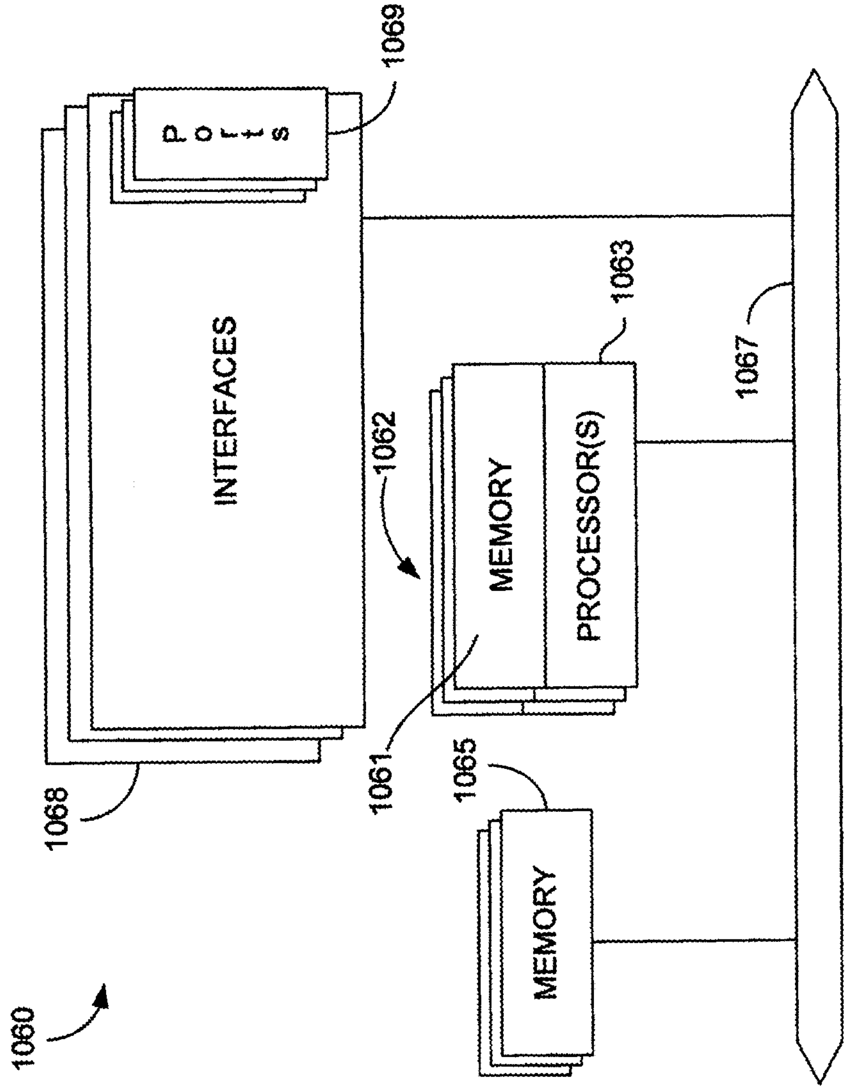
FIG. 10 depicts a network device that may be used for some implementations described herein.

FIG. 10 illustrates an example of a network device that may be configured for implementing some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 10) or switch fabric based (such as a cross-bar).

The above-described methods, devices and materials will be familiar to those of skill in the gaming industry and/or in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

I claim:

1. An apparatus, comprising:

an interface system comprising at least one network interface; and a logic system comprising at least one logic device, the logic system configured to do the following:

generate a first random number, provide the first random number to a device via the interface system, determine a time to generate a second random number, wherein the time is based upon a randomly determined time interval, generate the second random number, provide the second random number to the device via the interface system, receive a response from the device via the interface system, ascertain whether the response comprises a result of a predetermined mathematical operation involving the first random number and the second random number, and determine whether to provide wager gaming services to the device depending, at least in part, on whether the response comprises the result of the predetermined mathematical operation.

2. The apparatus of claim 1, wherein the predetermined mathematical operation comprises an exclusive "OR" operation.

3. The apparatus of claim 1, wherein the predetermined mathematical operation comprises at least one of modulo addition, multiplication or convolution.

4. The apparatus of claim 1, wherein the logic system is further configured to send, via the interface system, a command to disable the device if the response does not comprise the result of the predetermined mathematical operation.

5. The apparatus of claim 1, wherein the logic system is further configured to provide the wager gaming services to the device if the response comprises the result of the predetermined mathematical operation.

6. The apparatus of claim 1, wherein the logic system is further configured to provide the wager gaming services to the device prior to at least one of the determining, ascertaining or receiving steps.

7. The apparatus of claim 6, wherein the logic system is further configured to stop providing the wager gaming services to the device if the response does not comprise the result of the predetermined mathematical operation.

8. The apparatus of claim 1, wherein the time is based upon a predetermined time interval.

9. A method, comprising:

generating a first random number;

providing the first random number to a device;

determining a time to generate a second random number, wherein the time is based upon a randomly determined time interval;

generating the second random number;

providing the second random number to the device;

receiving a response from the device;

ascertaining whether the response comprises a result of a predetermined mathematical operation involving the first random number and the second random number; and determining whether to provide wager gaming services to the device depending, at least in part, on whether the response comprises the result of the predetermined mathematical operation.

10. The method of claim 9, wherein the predetermined mathematical operation comprises an exclusive "OR" operation.

11. The method of claim 9, wherein the predetermined mathematical operation comprises at least one of modulo addition, multiplication or convolution.

12. The method of claim 9, further comprising sending a command to disable the device if the response does not comprise the result of the predetermined mathematical operation.

13. The method of claim 9, further comprising providing the wager gaming services to the device if the response comprises the result of the predetermined mathematical operation.

14. The method of claim 9, further comprising providing the wager gaming services to the device prior to at least one of the determining, ascertaining or receiving steps.

15. A system, comprising:

means for generating a first random number and a second random number;

means for determining a time to generate the second random number, wherein the second random number is based upon a randomly determined time interval;

means for providing the first random number and the second random number to a device;

means for receiving a response from the device; and means for ascertaining whether the response comprises a result of a predetermined mathematical operation involving the first random number and the second random number and for determining whether to provide wager gaming services to the device depending, at least in part, on whether the response comprises the result of the predetermined mathematical operation.

16. The system of claim 15, further comprising means for providing wager gaming services to the device.

17. An apparatus, comprising:

a network interface;

a display device; and a logic system comprising a logic device and an associated memory, wherein the logic device is configured to do the following:

receive, via the network interface, a first number, store the first number in the memory, receive, via the network interface, a second number, perform a predetermined mathematical operation involving the first number and the second number to produce a first result, transmit the first result to a device via the network interface, control the display device to display wager gaming images according to instructions received via the network interface, receive, via the network interface, a third number, perform the predetermined mathematical operation involving the second number and the third number to produce a second result, and transmit the second result to the device via the network interface.

18. The apparatus of claim 17, wherein the logic system is further configured to do the following:

receive, via the network interface, a command; and cease the display of wager gaming images in response to the command.

19. The apparatus of claim 17, wherein the logic system is further configured to delete at least one of the first number or the first result.

20. The apparatus of claim 17, wherein the logic system is further configured to store the second number in the memory.

21. The apparatus of claim 17, further comprising a user interface, wherein the logic system is further configured to receive user input data from the user interface and transmit the user input data to a game server via the network interface.

22. The apparatus of claim 17, further comprising a speaker, wherein the logic system is further configured to control the speaker to reproduce wager gaming sounds according to instructions received via the network interface.

23. The apparatus of claim 17, wherein the network interface comprises a wireless interface.

24. The apparatus of claim 17, wherein the predetermined mathematical operation comprises an exclusive "OR" operation.

25. The apparatus of claim 17, wherein the logic system is further configured to delete at least one of the second number or the second result.

26. A method, comprising:

receiving, at a first device, a first number at a first time;

storing the first number;

receiving, at the first device, a second number at a second time;

performing a predetermined mathematical operation involving the first number and the second number to produce a first result;

transmitting the first result to a second device;

controlling the first device to make a presentation of wager games, at least in part according to instructions received from the second device, receiving, at the first device, a third number;

performing the predetermined mathematical operation involving the second number and the third number to produce a second result;

transmitting the second result to the second device; and deleting at least one of the first number or the first result.

27. The method of claim 26, further comprising:

receiving, at the first device, a command; and ceasing the presentation of wager games in response to the command.

28. The method of claim 26, further comprising storing the second number.

29. The method of claim 26, wherein the first device comprises a user interface, further comprising:

receiving user input data from the user interface; and transmitting the user input data to a game server.

30. The method of claim 26, wherein the first device comprises a speaker, further comprising controlling the speaker to reproduce wager gaming sounds according to instructions received by the first device.

31. An apparatus, comprising:

means for receiving a first random number and a second random number;

means for determining a time to generate the second random number, wherein the second random number is received upon a randomly determined time interval;

means for performing a predetermined mathematical operation involving the first random number and the second random number to produce a first result;

means for transmitting the first result to a device; and means for controlling a presentation of wager games, at least in part according to instructions received from the device.

32. The apparatus of claim 31, wherein the controlling means is configured to cease the presentation of wager games in response to a command received from the device.

* * * * *